United States Patent [19]
Kim

[11] Patent Number: 6,016,168
[45] Date of Patent: Jan. 18, 2000

[54] COLOR CORRECTION DEVICE

[75] Inventor: Jin-gu Kim, Suwon, Rep. of Korea

[73] Assignee: Samsung Electronics Co., Ltd., Kyungki-do, Rep. of Korea

[21] Appl. No.: 08/900,285

[22] Filed: Jul. 25, 1997

[30] Foreign Application Priority Data

Jul. 25, 1996 [KR] Rep. of Korea ...................... 96-30453

[51] Int. Cl.$^7$ ...................................................... H04N 9/67
[52] U.S. Cl. .......................... 348/661; 348/659; 348/655; 348/679; 358/518; 358/523; 382/167; 345/154
[58] Field of Search ................................... 348/645–651, 348/660–662, 679, 655; 358/518, 523; 382/107; 345/153, 154

[56] References Cited

U.S. PATENT DOCUMENTS

| | | | |
|---|---|---|---|
| 2,845,472 | 7/1958 | King et al. ............... | 348/661 |
| 4,379,292 | 4/1983 | Minato et al. ............ | 348/655 |
| 4,525,736 | 6/1985 | Korman .................... | 348/650 |
| 4,642,676 | 2/1987 | Weinger .................... | 348/661 |
| 4,750,050 | 6/1988 | Sarabia .................... | 348/649 |
| 5,073,818 | 12/1991 | Iida .......................... | 358/523 |
| 5,196,923 | 3/1993 | Ueda et al. ............... | 348/647 |
| 5,289,295 | 2/1994 | Yumiba et al. ........... | 358/518 |
| 5,452,017 | 9/1995 | Hickman ................... | 348/646 |
| 5,489,998 | 2/1996 | Yamada et al. ........... | 358/523 |
| 5,506,946 | 4/1996 | Bar ........................... | 395/131 |
| 5,552,904 | 9/1996 | Ryoo et al. ............... | 358/518 |
| 5,633,953 | 5/1997 | Kouzaki ................... | 358/523 |
| 5,717,783 | 2/1998 | Endo et al. ............... | 358/523 |
| 5,726,682 | 3/1998 | Lum et al. ................ | 348/661 |
| 5,726,910 | 3/1998 | Toma ....................... | 364/526 |
| 5,742,520 | 4/1998 | Uchikawa et al. ....... | 358/518 |
| 5,784,050 | 7/1998 | Corry ....................... | 345/154 |

FOREIGN PATENT DOCUMENTS

| | | | |
|---|---|---|---|
| 0 188 098 | 7/1986 | European Pat. Off. ......... | H04N 1/46 |
| 2 301 976 | 12/1996 | United Kingdom ............. | H04N 9/64 |

OTHER PUBLICATIONS (Benson, Color Representation, Television Engineering Handbook, pp. 2.7–2.17, 2.30–2.43), 1986.

*Primary Examiner*—Andrew I. Faile
*Assistant Examiner*—Reuben M. Brown
*Attorney, Agent, or Firm*—Sughrue, Mion, Zinn, Macpeak & Seas, PLLC

[57] ABSTRACT

A color correction device, for strengthening or weakening a specific color according to the selection of a user, is provided. In a color correction device, the area of an input color signal is determined according to chrominance axes, coefficients of a corresponding coordinate of the chrominance axes are read from a storage memory, and a matrix operation is performed on the input color signal before it is output. An index table divides the area defined by chrominance axes on the basis of r, g, and b signals. A storage memory contains coefficients corresponding to the respective coordinate positions for correcting the color signal to represent colors similarly to the original color of the subject. A specific color may be strengthened or weakened based on the selection of a user, due to the addition of a second storage memory which contains, coefficient tables for designating areas according to the chrominance axes corresponding to a color to be strengthened or weakened. Therefore, a user can strengthen or weaken a desired color due to the addition of an additional coefficient table memory.

9 Claims, 2 Drawing Sheets

COLOR CORRECTION DEVICE

BACKGROUND OF THE INVENTION

1. Field of the Invention

The present invention relates to a color correction device of a video equipment. More particularly, it relates to a color correction device for strengthening or weakening a specific color according to the selection of a user. This application for a color correction device is based on Korean Patent Application No. 96-30453 which is incorporated herein by reference for all purposes.

2. Description of the Related Arts

In general, a color correction device corrects the phase and amplitude of an input color signal to make them conform to the phase and amplitude of a color signal appropriate for output to a cathode ray tube.

FIG. 1 is a block diagram of a conventional color correction device. In FIG. 1, reference numerals 101, 102, 103, and 104 are, respectively, an area determining unit, an index table, a coefficient table memory, and an operation unit. R, G, and B signals, separated from a color signal of a video signal which is input from a received broadcast or a VTR, are applied to the input of the color correction device.

The area determining unit 101 calculates the positions of the input R, G, and B signals chrominance axes, shown in FIG. 2, and outputs them as r and g signals. The r and g signals are determined according to the formulae:

$$r = R/(R+G+B) \quad \text{equation (1);}$$

$$g = G/(R+G+B) \quad \text{equation (2).}$$

A b signal need not be separately calculated, since it is related to r and g. The r and g signals output from the area determining unit 101 are input to the index table 102. The index table 102 represents the r, g, and b signals as a point on the chrominance axes.

The coefficient table memory 103 stores coefficients corresponding to the points on the chrominance axes. A particular coefficient matrix, with respect to a corresponding coordinate output from the index table 102, is read from the coefficient table memory 103 and input to the operation unit 104.

The operation unit 104 performs a matrix operation on the R, G, and B signals, input to the operation unit 104, with the coefficients read from the coefficient table memory 103, and outputs R', G', and B' which are color-corrected outputs. The input R, G, and B signals are corrected to be similar to the original colors of the subject, and are output to the cathode ray tube after such an operation.

Therefore, in the conventional color correction device, there is a problem in that a specific color cannot be strengthened by a user, since the input signal can only be corrected to be similar to the original colors of the subject.

SUMMARY OF THE INVENTION

It is an object of the present invention to provide a color correction device for strengthening or weakening a specific color according to the selection of a user.

To achieve the above object, there is provided a color correction device which includes an area determining unit for calculating the positions of input R, G, and B signals on chrominance axes, and outputting them as r and g signals, and an index table for uniformly dividing the area defined by the chrominance axes (on the basis of r, g, and b axes) and outputting an address corresponding to the positions determined by the area determining unit.

The color correction device also has a first storing unit for storing as a table, at designated addresses, all the coefficient matrices corresponding to the areas assigned by the index table, and a second storing unit for designating, on the basis of a specific color, the region of a color to be strengthened or weakened in the first storing unit by a predetermined amount, and storing a categorized coefficient table of coefficient matrices. The color correction device further includes a coefficient table selection unit which selects a coefficient matrix, from a coefficient table in the second storing unit in which a specific color is strengthened or weakened, when a user desires to strengthen or weaken a specific color. An operation unit in the color correction device adaptively changes input R, G, and B signals by using the selected coefficient matrix and a matrix operation.

The operation unit can function to correct the color of an input signal to be similar to the original color of the image subject. Alternatively, the operation unit can function to outputting the color signals as R', B', and G' in which a specific color is strengthened or weakened according to the selection of a user. The index table reads coefficients from the first storing unit, by using the address of a corresponding area on the chrominance axes, and outputs the coefficients to the operation unit when no specific color is selected by a user to be strengthened or weakened. When a specific color is selected by a user to be strengthened or weakened, the index table reads coefficients from the second storing unit for storing coefficients for strengthening or weakening a specific color, according to the address of a corresponding area on the chrominance axes.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Figure 1:
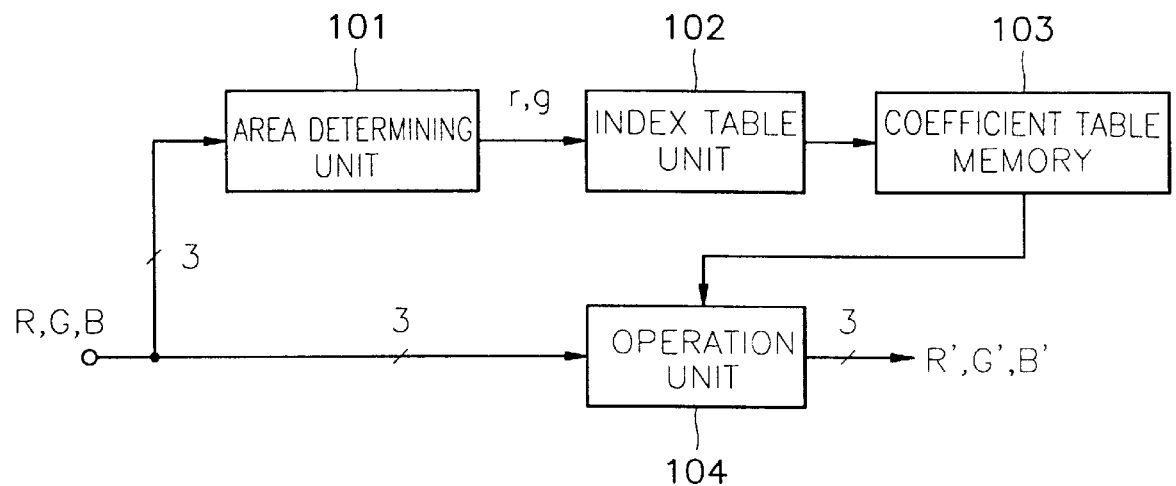
FIG. 1 is a block diagram of a conventional color correction device.

The color correction device for strengthening or weakening a specific color, according to the present invention includes an area determining unit 301, an index table 302, a first storing unit 303, a second storing unit 304, a coefficient table selection unit 305, and an operation unit 306.

The area determining unit 301 is for determining the chrominance coordinate position of an input color signal with respect to chrominance axes of a chrominance domain.

The index table 302 is for designating the addresses of coefficients corresponding to what particular divided subarea the determined position falls with respect to the chrominance axes. The first storing unit 303 is for storing color correction coefficients. The second storing unit 304 is for storing coefficients used when changing the input color signal by strengthening or weakening a specific color. The coefficient table selection unit 305 is for designating a coefficient table based upon the selection signal of a user. The operation unit 306 is for performing a matrix operation using the input signal and coefficients appropriate to the input signal.

The area determining unit 301 calculates the positions of the input R, G, and B signals on the chrominance axes, and outputs them as r and g signals. Signals r and g are determined according to equations (1) and (2), above. Signal b need not be separately calculated, since it is related to r and g. Namely, the position on the chrominance axes shown in FIG. 2 can be defined by r and g alone.

Figure 2:
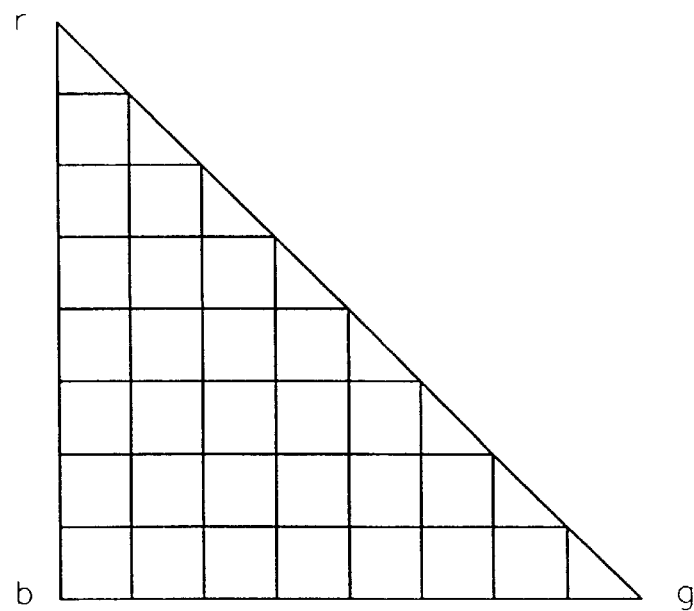
FIG. 2 shows divided chrominance axes of an index table, such as that of FIG. 1.
Figure 3:
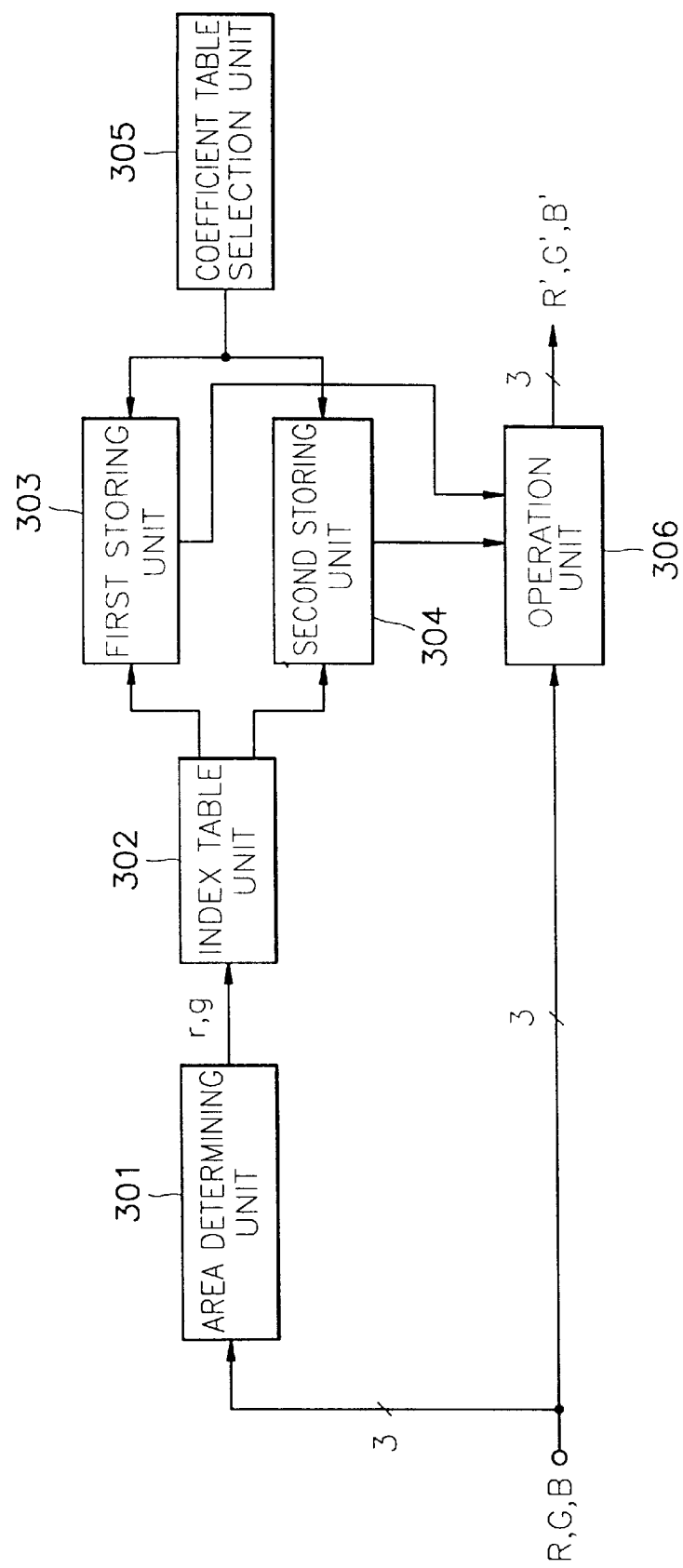
FIG. 3 is a block diagram of a color correction device for strengthening or weakening a specific color, according to the present invention.

The index table 302 designates a portion of the chrominance axes area shown in FIG. 2 according to the values of the color signals r, g, and b. The index table 302 divides the area defined by the chrominance axes on the basis of the r, g, and b axes, as shown in FIG. 2, and outputs an address corresponding to the area in which the position determined by the area determining unit 301 lies.

The first storing unit 303 stores the coefficients corresponding to the areas divided by the index table 302, at designated addresses. The second storing unit 304 stores tables of the coefficients corresponding to a number of designated areas of specific colors to be strengthened or weakened by various degrees. When a user wants to strengthen or weaken a specific color, the coefficient table selection unit 305 selects a coefficient table according to which the specific color of the second storing unit 304 is strengthened or weakened.

When a user does not select a specific color to be strengthened or weakened, the index table 302 has the first storage portion 303 output a coefficient matrix to the operation unit 306 according to the address of a corresponding area on the chrominance axes. In the alternative, when a user selects a specific color to be strengthened or weakened, the index table 302 has the second storing unit 304 output, from a coefficient table selected by the coefficient table selection unit 305 based on the user's selection, a coefficient matrix to operation unit 306 according to the address of a corresponding area on the chrominance axes determined by the input color signal.

The operation unit 306 adaptively changes input R, G, and B signals by using the appropriate coefficients and a matrix operation, and corrects or selectively modifies the color of the input signal. The color is corrected to be similar to the original color of the subject, or is output as R', B', and G' in which a specific color selected by a user is strengthened or weakened. This matrix operation is represented by the following formula, equation (3):

$$\begin{bmatrix} R' \\ G' \\ B' \end{bmatrix} = \begin{bmatrix} a_1 & a_2 & a_3 \\ a_4 & a_5 & a_6 \\ a_7 & a_8 & a_9 \end{bmatrix} \begin{bmatrix} R \\ G \\ B \end{bmatrix}$$

Namely, a color correction effect is obtained by correcting coefficients $a_1$ through $a_9$ in a desired area on r, g, and b chrominance axes, and outputting specified colors R', G', and B'.

When no particular color is specified to be strengthened or weakened by a user, the coefficient table selection unit 305 selects a general coefficient table, in which no specific color is strengthened or weakened. Then, the operation unit 306 operates on the input color signal using the selected general coefficient table, corrects the signal to be similar to the original color of the subject, and outputs it.

If a user selects a specific color to be, for example, strengthened, and thereby a specific coefficient table in the coefficient table selection unit 305, then the second storing unit 304 restricts the scope of an address to the and coefficient matrices of the coefficient table in which the specified color is strengthened. Therefore, the index table 302 selects an address in order to read, from the second storing unit 304, the coefficient matrix by which the specified color is strengthened, according to the determining value of an input chrominance coordinate. Then, the operation unit 306 operates on the input color signal, using the coefficient matrix read from the second storing unit, and changes it into a color signal in which the specific color is strengthened.

As mentioned above, according to the present invention, a user can strengthen or weaken a desired color by adding an additional coefficient table memory, i.e., including coefficient tables stored in the second storing unit by which any of various specific colors are strengthened or weakened.

The present invention has been described in terms of a preferred embodiment, however, it will be appreciated by those of ordinary skill in the art that various changes and modifications may be made to the described embodiment without departing from the spirit and scope of the invention.

What is claimed is:

1. A color correction device, comprising;
   a determining unit which calculates the position of input R, G, and B signals on chrominance axes, and outputs the position as at least two of r, b, and g signals;
   an index table unit which uniformly divides the area defined by the chrominance axes into plural positions, and outputs an address corresponding to the position of the R, G, and B signals according to said at least two of r, b, and g signals;
   a first memory which stores one or more correction coefficient tables of correction coefficients, corresponding to the plural positions assigned by said index table unit, at designated addresses;
   a second memory which stores one or more modification coefficient tables of modification coefficients, corresponding to the plural positions assigned by said index table unit, at designated addresses, each of said modification coefficients tables designating a region corresponding to a color to be strengthened or weakened on the basis of a specific color;
   a coefficient table selector which selects a modification coefficient table from said second memory corresponding to a strengthening or weakening of a particular color based on a user adjustment input or which selects a correction coefficient table from said first memory in an absence of a user adjustment input; and an operation unit which adaptively changes said input R, G, and B signals through a matrix operation using coefficients corresponding to said address output by said index table unit and corresponding to the coefficient table selected by said coefficient table selector and outputting the adaptively changed R, G, and H signals as R', B', and G' signals.

2. The color correlation device according to claim 1, wherein coefficients are read from said first memory into said operation unit, according to the address corresponding to the area on the chrominance axes corresponding to said at least two of r, b, and g signals, when no specific color is selected by a user to be strengthened or weakened, and wherein coefficients are read from said second memory into said operation unit, according to the address corresponding to the area on the chrominance axes corresponding to said at least two of r, b, and g signals, when a specific color is selected by a user to be strengthened or weakened.

3. The color correction device according to claim 1, wherein signals r and g are determined according to the formulae: $r=R/(R+G+B)$; $g=G/(R+G+B)$.

4. The color correction device according to claim 1, wherein said at least two of r, b, and g signals include said r and g signals.

5. The color correction device according to claim 4, wherein said r and g signals are determined according to the formulae: $r=R/(R+G+B)$; $g=G/(R+G+B)$.

6. The color correction device according to claim 2, wherein said at least two of r, b, and g signals include said r and g signals.

7. The color correction device according to claim 6, wherein said r and g signals are determined according to the formulae: $r=R/(R+G+B)$; $g=G/(R+G+B)$.

8. The color correction device according to claim 1, wherein said user adjustment input is different than data contained in said modification coefficient tables.

9. The color correction device according to claim 1, wherein data contained in said modification coefficient tables is prestored in said second memory before said user adjustment input is input.

* * * * *